(12) United States Patent
Kawamura (10) Patent No.: US 11,898,471 B2
(45) Date of Patent: Feb. 13, 2024

(54) VALVE TIMING ADJUSTMENT DEVICE

(71) Applicant: DENSO CORPORATION, Kariya (JP)

(72) Inventor: Futoshi Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 147 days.

(21) Appl. No.: 17/483,605

(22) Filed: Sep. 23, 2021

(65) Prior Publication Data

US 2022/0010698 A1 Jan. 13, 2022

Related U.S. Application Data

(63) Continuation of application No. PCT/JP2020/012749, filed on Mar. 23, 2020.

(30) Foreign Application Priority Data

Mar. 25, 2019 (JP) ................................. 2019-055931

(51) Int. Cl.
*F01L 1/344* (2006.01)
*F16K 11/07* (2006.01)
*F16K 27/04* (2006.01)

(52) U.S. Cl.
CPC ............ *F01L 1/3442* (2013.01); *F16K 11/07* (2013.01); *F16K 27/041* (2013.01); *F01L 2001/34426* (2013.01)

(58) Field of Classification Search
CPC ........... F01L 1/3442; F01L 2001/34426; F01L 2001/3443; F01L 2001/34433; F01L 2001/34479; F16K 11/07; F16K 27/041
See application file for complete search history.

(56) References Cited

U.S. PATENT DOCUMENTS

2010/0175651 A1* 7/2010 Takenaka ................ F01L 1/022
464/160
2011/0259289 A1* 10/2011 Fujiyoshi .............. F01L 1/3442
123/90.15

(Continued)

FOREIGN PATENT DOCUMENTS

JP H10-141022 5/1998
JP 2020-159201 10/2020

(Continued)

OTHER PUBLICATIONS

U.S. Appl. No. 17/483,239, to Kawamura, entitled "Hydraulic Oil Control Valve and Valve Timing Adjustment Device", filed Sep. 23, 2021 (41 pages).

(Continued)

*Primary Examiner* — Wesley G Harris
(74) *Attorney, Agent, or Firm* — Nixon & Vanderhye P.C.

(57) ABSTRACT

A valve timing adjustment device includes a vane rotor and a hydraulic oil control valve. The vane rotor is fixed to an end portion of one of a drive shaft and a driven shaft and defines a through hole. The hydraulic oil control valve includes a sleeve and a spool. The sleeve includes a body portion in the through hole and a fixing portion fixed into a shaft fixing hole defined in the one. At least a portion of the through hole is sealed by the body portion. A difference between a radial dimension of the shaft fixing hole and a radial dimension of the fixing portion is greater than a total of a predetermined coaxiality between the through hole and the shaft fixing portion and a predetermined coaxiality between the body portion and the fixing portion.

2 Claims, 6 Drawing Sheets

(56) References Cited

U.S. PATENT DOCUMENTS

| | | | |
|---|---|---|---|
| 2012/0097122 A1* | 4/2012 | Lichti | F01L 1/3442 123/90.15 |
| 2016/0076408 A1* | 3/2016 | Nagura | F01L 1/3442 123/90.15 |
| 2017/0175593 A1* | 6/2017 | Asahi | F01L 1/34 |
| 2019/0323388 A1 | 10/2019 | Mitsutani | |
| 2019/0323392 A1 | 10/2019 | Mitsutani | |
| 2019/0368387 A1 | 12/2019 | Mitsutani | |

FOREIGN PATENT DOCUMENTS

| | | |
|---|---|---|
| JP | 2020-159203 | 10/2020 |
| JP | 2020-159204 | 10/2020 |
| WO | 2020/196403 | 10/2020 |
| WO | 2020/196404 | 10/2020 |
| WO | 2020/196454 | 10/2020 |
| WO | 2020/196456 | 10/2020 |
| WO | 2020/196457 | 10/2020 |

OTHER PUBLICATIONS

U.S. Appl. No. 17/483,371, to Kawamura, entitled "Hydraulic Oil Control Valve and Valve Timing Adjustment Device", filed Sep. 23, 2021 (33 pages).

U.S. Appl. No. 17/483,437, to Kawamura, entitled "Hydraulic Oil Control Valve and Valve Timing Adjustment Device", filed Sep. 23, 2021 (47 Pages).

U.S. Appl. No. 17/483,499, to Kawamura, entitled "Hydraulic Oil Control Valve and Valve Timing Adjustment Device", filed Sep. 23, 2021 (42 pages).

U.S. Appl. No. 17/483,540, to Kawamura, entitled "Hydraulic Oil Control Valve and Valve Timing Adjustment Device", filed Sep. 23, 2021 (53 pages).

U.S. Appl. No. 17/483,239, filed Sep. 23, 2021, Hydraulic Oil Control Valve and Valve Timing Adjustment Device.

U.S. Appl. No. 17/483,371, filed Sep. 23, 2021, Hydraulic Oil Control Valve and Valve Timing Adjustment Device.

U.S. Appl. No. 17/483,437, filed Sep. 23, 2021, Hydraulic Oil Control Valve and Valve Timing Adjustment Device.

U.S. Appl. No. 17/483,499, filed Sep. 23, 2021, Hydraulic Oil Control Valve and Valve Timing Adjustment Device.

U.S. Appl. No. 17/483,540, filed Sep. 23, 2021, Hydraulic Oil Control Valve and Valve Timing Adjustment Device.

U.S. Appl. No. 17/483,605, filed Sep. 23, 2021, Valve Timing Adjustment Device.

* cited by examiner

VALVE TIMING ADJUSTMENT DEVICE

CROSS REFERENCE TO RELATED APPLICATION

The present application is a continuation application of International Patent Application No. PCT/JP2020/012749 filed on Mar. 23, 2020, which designated the U.S. and claims the benefit of priority from Japanese Patent Application No. 2019-055931 filed on Mar. 25, 2019. The entire disclosures of all of the above applications are incorporated herein by reference.

TECHNICAL FIELD

The present disclosure relates to a valve timing adjustment device.

BACKGROUND

A hydraulic valve timing adjustment device that is capable of adjusting valve timing of an intake valve or an exhaust valve of an internal combustion engine has been known. In the hydraulic valve timing adjustment device, a supply of hydraulic oil to each hydraulic chamber of a phase shifting portion and a drain of hydraulic oil from each hydraulic chamber may be realized by a hydraulic oil control valve.

SUMMARY

A valve timing adjustment device is configured to adjust valve timing of a valve in an internal combustion engine. The valve is configured to be selectively opened or closed by a driven shaft to which a driving force is transmitted from a drive shaft. The valve timing adjustment device includes a vane rotor and a hydraulic oil control valve. The vane rotor is fixed to an end portion of one of the drive shaft and the driven shaft, configured to rotate together with the one of the drive shaft and the driven shaft, and configured to alter a phase of the one of the drive shaft and the driven shaft relative to the other of the drive shaft and the driven shaft according to a pressure of a hydraulic oil supplied from a hydraulic oil supply source. The vane rotor defines a through hole passing through the vane rotor in an axial direction. The hydraulic oil control valve is configured to perform a flow control of the hydraulic oil. The flow control includes a control to supply the hydraulic oil to the vane rotor and a control to discharge the hydraulic oil from the vane rotor. The hydraulic oil control valve includes a tubular sleeve and a spool. The sleeve includes a body portion disposed in the through hole and a fixing portion inserted and fixed into a shaft fixing hole that is defined in the end portion of the one of the drive shaft and the driven shaft. The spool is configured to slidably move in the axial direction within the sleeve. At least a portion of the through hole in the axial direction is sealed by the body portion. A difference between a radial dimension of the shaft fixing hole and a radial dimension of the fixing portion is greater than a total of a predetermined coaxiality between the through hole and the shaft fixing portion and a predetermined coaxiality between the body portion and the fixing portion.

DESCRIPTION OF EMBODIMENT

To begin with, examples of relevant techniques will be described.

A hydraulic valve timing adjustment device that is capable of adjusting valve timing of an intake valve or an exhaust valve of an internal combustion engine has been known. In the hydraulic valve timing adjustment device, a supply of hydraulic oil to each hydraulic chamber of a phase shifting portion and a drain of hydraulic oil from each hydraulic chamber may be realized by a hydraulic oil control valve. For example, a hydraulic oil control valve is arranged apart from a phase shifting portion of a valve timing adjustment device and that switches oil passages by sliding a spool within a cylindrical sleeve.

In recent years, in order to improve the responsiveness of the valve timing adjustment device, an integrated valve timing adjusting device in which a hydraulic oil control valve is arranged in a center of a vane rotor has been proposed. Generally, in the integrated valve timing adjustment device, the hydraulic oil control valve and the vane rotor are fixed to a shaft. In general, in the integrated valve timing adjustment device, in order to define oil passages through which the hydraulic oil is supplied from the hydraulic oil control valve to hydraulic chambers, a sealing between an outer circumferential surface of the hydraulic oil control valve and an inner circumferential surface of the vane rotor is required. Thus, a gap between the outer circumferential surface of the hydraulic oil control valve and the inner circumferential surface of the vane rotor is set to an extremely small value. Since the gap is extremely small, the inventor of the present application has found a risk that the hydraulic oil control valve cannot be fixed to the shaft with an axial force equal to or higher than a predetermined value when coaxialities between members are large due to manufacturing errors of the members. Therefore, a technique capable of suppressing a decrease in reliability in fixing the hydraulic oil control valve of the integrated valve timing adjustment device and the shaft is desired.

The present disclosure has been made to solve at least a part of the above problems, and can be implemented as the following embodiments.

According to one embodiment of the present disclosure, a valve timing adjustment device is provided. This valve timing adjustment device is configured to adjust valve timing of a valve in an internal combustion engine. The valve is configured to be selectively opened or closed by a driven shaft to which a driving force is transmitted from a drive shaft. The valve timing adjustment device includes a vane rotor and a hydraulic oil control valve. The vane rotor is fixed to an end portion of one of the drive shaft and the driven shaft, configured to rotate together with the one of the drive shaft and the driven shaft, and configured to alter a phase of the one of the drive shaft and the driven shaft relative to the other of the drive shaft and the driven shaft according to a pressure of a hydraulic oil supplied from a hydraulic oil supply source. The vane rotor defines a through hole passing through the vane rotor in an axial direction. The hydraulic oil control valve is configured to perform a flow control of the hydraulic oil. The flow control includes a control to supply the hydraulic oil to the vane rotor and a control to discharge the hydraulic oil from the vane rotor. The hydraulic oil control valve includes a tubular sleeve and a spool. The sleeve includes a body portion disposed in the through hole and a fixing portion inserted and fixed into a shaft fixing hole that is defined in the end portion of the one of the drive shaft and the driven shaft. The spool is configured to slidably move in the axial direction within the sleeve. At least a portion of the through hole in the axial direction is sealed by the body portion. A difference between a radial dimension of the shaft fixing hole and a radial dimension of the fixing portion is greater than a total of a predetermined coaxiality between the through hole and the shaft fixing portion and a predetermined coaxiality between the body portion and the fixing portion.

According to the valve timing adjustment device of the present embodiment, a difference between the radial dimension of the shaft fixing hole and the radial dimension of the fixing portion is set to a value greater than a total value of a predetermined coaxiality between the through hole and the shaft fixing hole and a predetermined coaxiality between the body portion and the fixing portion. Thus, an influence of a misalignment between the through hole and the shaft through hole and a misalignment between the body portion and the fixing portion which are caused by manufacturing errors can be absorbed by a difference (i.e., a play) between the radial dimension of the shaft fixing hole and the radial dimension of the fixing portion. Therefore, it is possible to fix the hydraulic oil control valve to the shaft with an axial force equal to or greater than a predetermined value, and a decrease in a reliability of the fixing between the shaft and the hydraulic oil control valve of the integrated valve timing adjustment device can be suppressed.

The present disclosure can be realized as the following embodiments. For example, the present disclosure can be realized in the embodiment of a method for manufacturing the valve timing adjustment device and the like.

A. Embodiment

Figure 1:
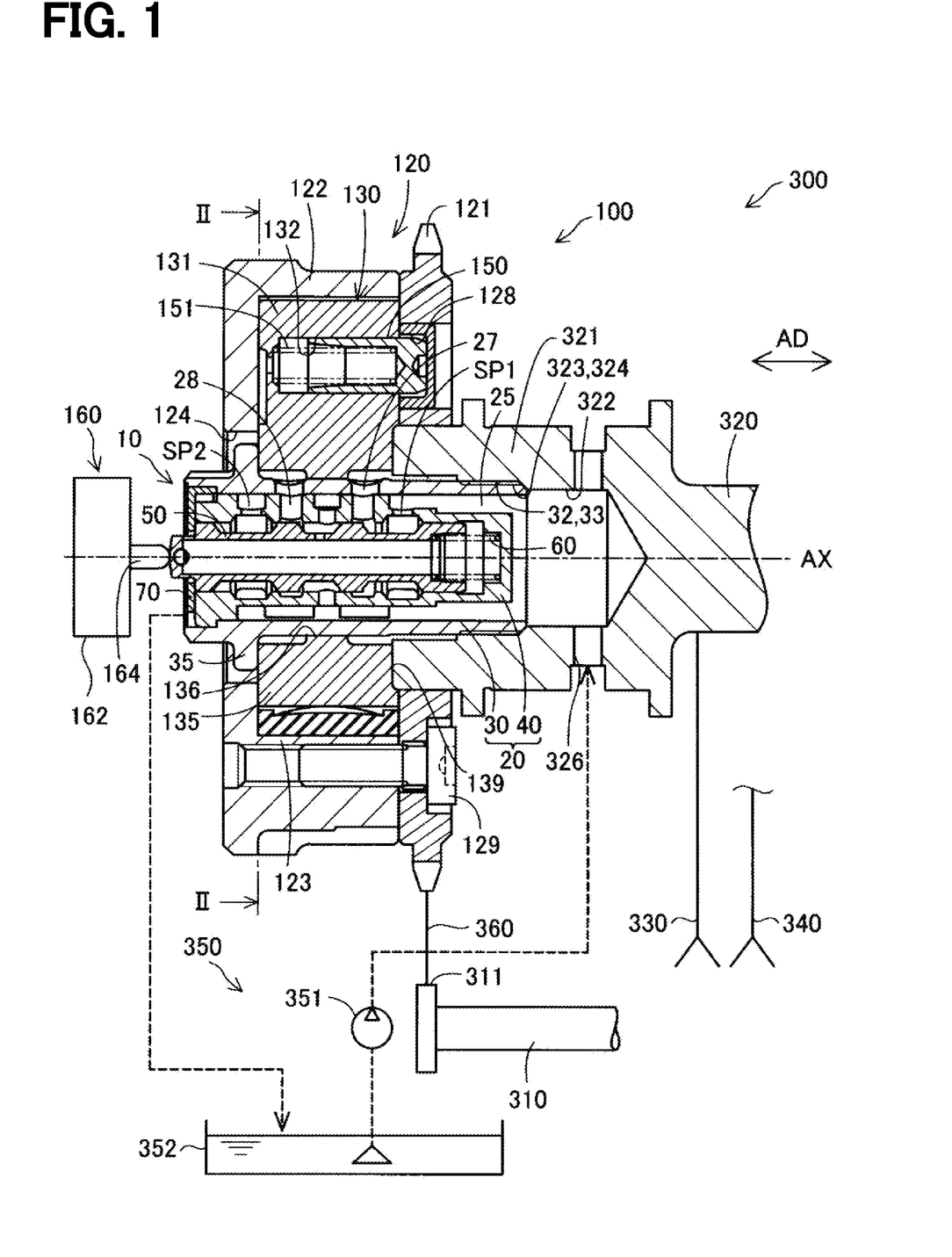
FIG. 1 is a cross-sectional view showing a schematic configuration of a valve timing adjustment device.

A-1. Device Configuration:

A valve timing adjustment device 100 shown in FIG. 1 is used for an internal combustion engine 300 of a vehicle (not shown) and configured to adjust valve timing of a valve that is opened or closed by a camshaft 320 to which a driving force is transmitted from a crankshaft 310. The valve timing adjustment device 100 is provided in a power transmission path from the crankshaft 310 to the camshaft 320. More specifically, the valve timing adjustment device 100 is fixed to an end portion 321 of the camshaft 320 in a direction along a rotational axis AX of the camshaft 320 (hereinafter, referred to as "an axial direction AD"). A rotational axis AX of the valve timing adjustment device 100 is substantially coaxial with the rotational axis AX of the camshaft 320. The valve timing adjustment device 100 of the present embodiment is configured to adjust a valve timing of an intake valve 330 in the intake valve 330 and an exhaust valve 340.

The end portion 321 of the camshaft 320 defines a shaft hole portion 322 and a supply inlet 326. The shaft hole portion 322 extends in the axial direction AD. The shaft hole portion 322 has a shaft fixing portion 323 on an inner circumferential surface of the shaft hole portion 322 to fix a hydraulic oil control valve 10 which will be described later. The shaft fixing portion 323 has a female thread portion 324. The female thread portion 324 is screwed with a male thread portion 33 formed in a fixing portion 32 of the hydraulic oil control valve 10. The supply inlet 326 extends in a radial direction and passes through the camshaft 320 between an outer circumferential surface of the camshaft 320 and the shaft hole portion 322. Hydraulic oil is supplied to the supply inlet 326 from a hydraulic oil supply source 350. The hydraulic oil supply source 350 includes an oil pump 351 and an oil pan 352. The oil pump 351 pumps the hydraulic oil stored in the oil pan 352.

Figure 2:
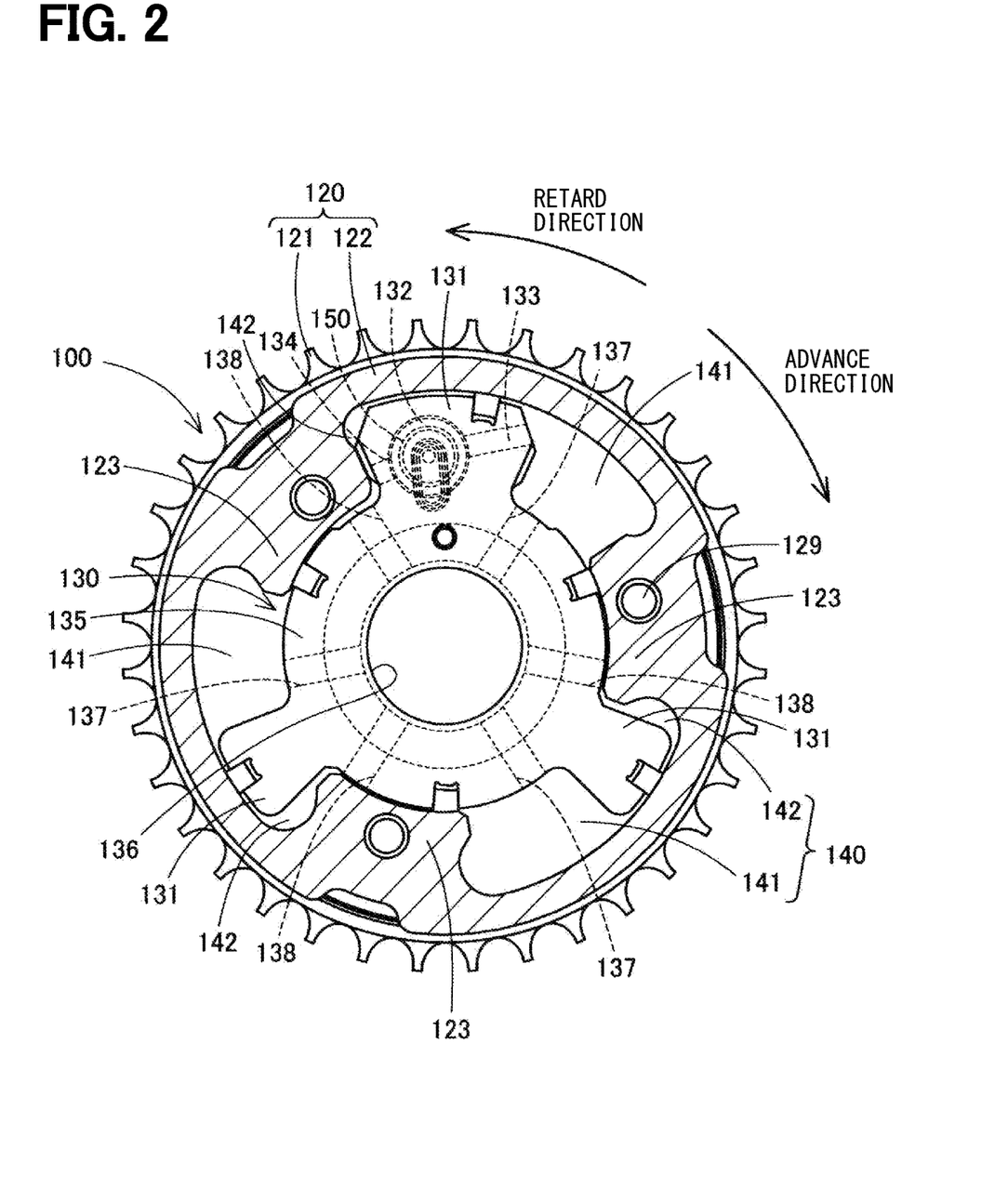
FIG. 2 is a cross-sectional view taken along a line II-II in FIG. 1.

As shown in FIGS. 1 and 2, the valve timing adjustment device 100 includes a housing 120, a vane rotor 130, and the hydraulic oil control valve 10. In FIG. 2, illustrations of the hydraulic oil control valve 10 are omitted.

As shown in FIG. 1, the housing 120 includes a sprocket 121 and a case 122. The sprocket 121 is fit to the end portion 321 of the camshaft 320 and is rotatably supported. The sprocket 121 defines a fitting recessed portion 128 at a position corresponding to a lock pin 150 which will be described later. An annular timing chain 360 is disposed around the sprocket 121 and a sprocket 311 of the crankshaft 310. The sprocket 121 is fixed to the case 122 with multiple bolts 129. Thus, the housing 120 rotates together with the crankshaft 310. The case 122 has a bottomed tubular shape and an opening end of the case 122 is closed by the sprocket 121. As shown in FIG. 2, the case 122 includes multiple partition walls 123 that protrude radially inward and are arranged in a circumferential direction. Spaces defined between adjacent ones of the partition walls 123 in the circumferential direction serve as hydraulic chambers 140. As shown in FIG. 1, the case 122 defines an opening 124 at a center of a bottom portion of the case 122.

The vane rotor 130 is housed inside the housing 120 and configured to rotate in a retard direction or in an advance direction relative to the housing 120 in accordance with a hydraulic pressure of the hydraulic oil supplied from the hydraulic oil control valve 10 which will be described later. Therefore, the vane rotor 130 serves as a phase shifting portion configured to shift a phase of a driven shaft relative to a drive shaft. The vane rotor 130 includes multiple vanes 131 and a boss 135.

As shown in FIG. 2, the multiple vanes 131 protrude radially outward from the boss 135 that is located at a center of the vane rotor 130 and are arranged adjacent to each other in the circumferential direction. The vanes 131 are housed respectively in the hydraulic chambers 140 and divide the hydraulic chambers 140 in the circumferential direction into retard chambers 141 and advance chambers 142. Each of the retard chambers 141 is located on one side of the vane 131 in the circumferential direction. Each of the advance chambers 142 is located on the other side of the vane 131 in the circumferential direction. One of the multiple vanes 131 defines a housing hole 132 in the axial direction. The housing hole 132 is in communication with the retard chamber 141 through a retard chamber pin control oil channel 133 defined in the vane 131 and in communication with the advance chamber 142 through an advance chamber pin control oil channel 134. The lock pin 150 is housed in the housing hole 132 such that the lock pin 150 can reciprocate in the axial direction AD in the housing hole 132. The lock pin 150 is configured to restrict the vane rotor 130 from rotating relative to the housing 120 and restrict the vane rotor 130 from coming into contact with the housing 120 in the circumferential direction when the hydraulic pressure is insufficient. The lock pin 150 is biased in the axial direction AD toward the fitting recessed portion 128 formed in the sprocket 121 by a spring 151.

The boss 135 has a tubular shape and is fixed to the end portion 321 of the camshaft 320. More specifically, the boss 135 has a rotor fitting portion 139 on an end surface of the boss 135 facing the camshaft 320, and the end portion 321 of the camshaft 320 is fit to the rotor fitting portion 139. Thereby, the boss 135 is fixed to the end portion 321 of the camshaft 320 such that a rotational axis AX of the vane rotor 130 is coaxial with the rotational axis AX of the camshaft 320. Therefore, the vane rotor 130 having the boss 135 is fixed to the end portion 321 of the camshaft 320 and rotates together with the camshaft 320 in an integral manner. The boss 135 defines a through hole 136 passing through the boss 135 in the axial direction at a center of the boss 135. The hydraulic oil control valve 10 is arranged in the through hole 136. The boss 135 defines multiple retard channels 137 and multiple advance channels 138. The retard channels 137 and the advance channels 138 pass through the boss 135 in the radial direction. The retard channels 137 and the advance channels 138 are arranged in the axial direction AD. The retard channels 137 fluidly connect between the retard chambers 141 and retard ports 27 of the hydraulic oil control valve 10 which will be described later. The advance channels 138 fluidly connect between the advance chambers 142 and advance ports 28 of the hydraulic oil control valve 10 which will be described later. In the through hole 136, gaps between the retard channels 137 and the advance channels 138 are sealed by a main body 31 of an outer sleeve 30 of the hydraulic oil control valve 10 which will be described later.

In the present embodiment, the vane rotor 130 are made of an aluminum alloy, but a material of the vane rotor 130 is not limited to the aluminum alloy and may be any metal material such as iron or stainless steel, a resin material, or the like.

As shown in FIG. 1, the hydraulic oil control valve 10 is coaxially arranged with the rotational axis AX of the valve timing adjustment device 100 and configured to control a flow of the hydraulic oil supplied from the hydraulic oil supply source 350. The operation of the hydraulic oil control valve 10 is controlled by an ECU (not shown) that controls an overall operation of the internal combustion engine 300. The hydraulic oil control valve 10 is driven by a solenoid 160 arranged on a side of the hydraulic oil control valve 10 opposite to the camshaft 320 in the axial direction AD. The solenoid 160 has an electromagnetic portion 162 and a shaft 164. The solenoid 160 moves the shaft 164 in the axial direction AD when the electromagnetic portion 162 is energized by instructions from the ECU. Thereby, the shaft 164 presses a spool 50 of the hydraulic oil control valve 10, which will be described later, toward the camshaft 320 against a biasing force of a spring 60. As will be described later, the spool 50 slides in the axial direction AD by being pressed, so that oil channels can be switched between oil channels in communication with the retard chambers 141 and oil channels in communication with the advance chambers 142.

Figure 3:
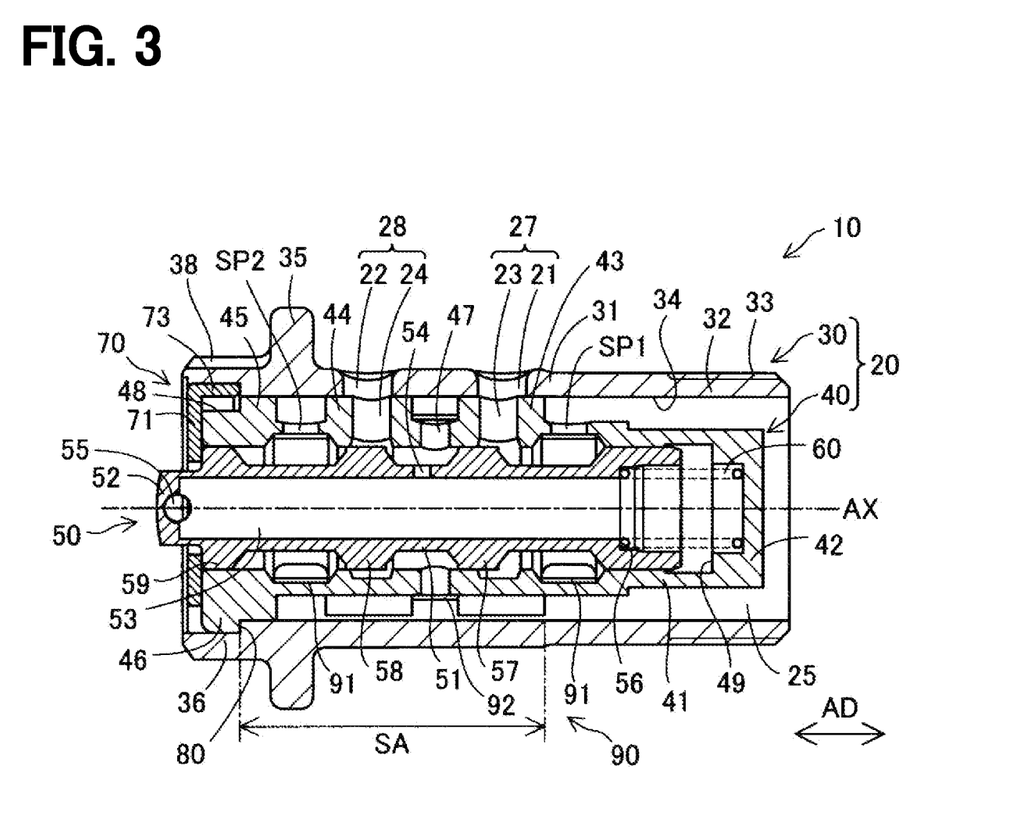
FIG. 3 is a cross-sectional view showing a detailed configuration of a hydraulic oil control valve.
Figure 4:
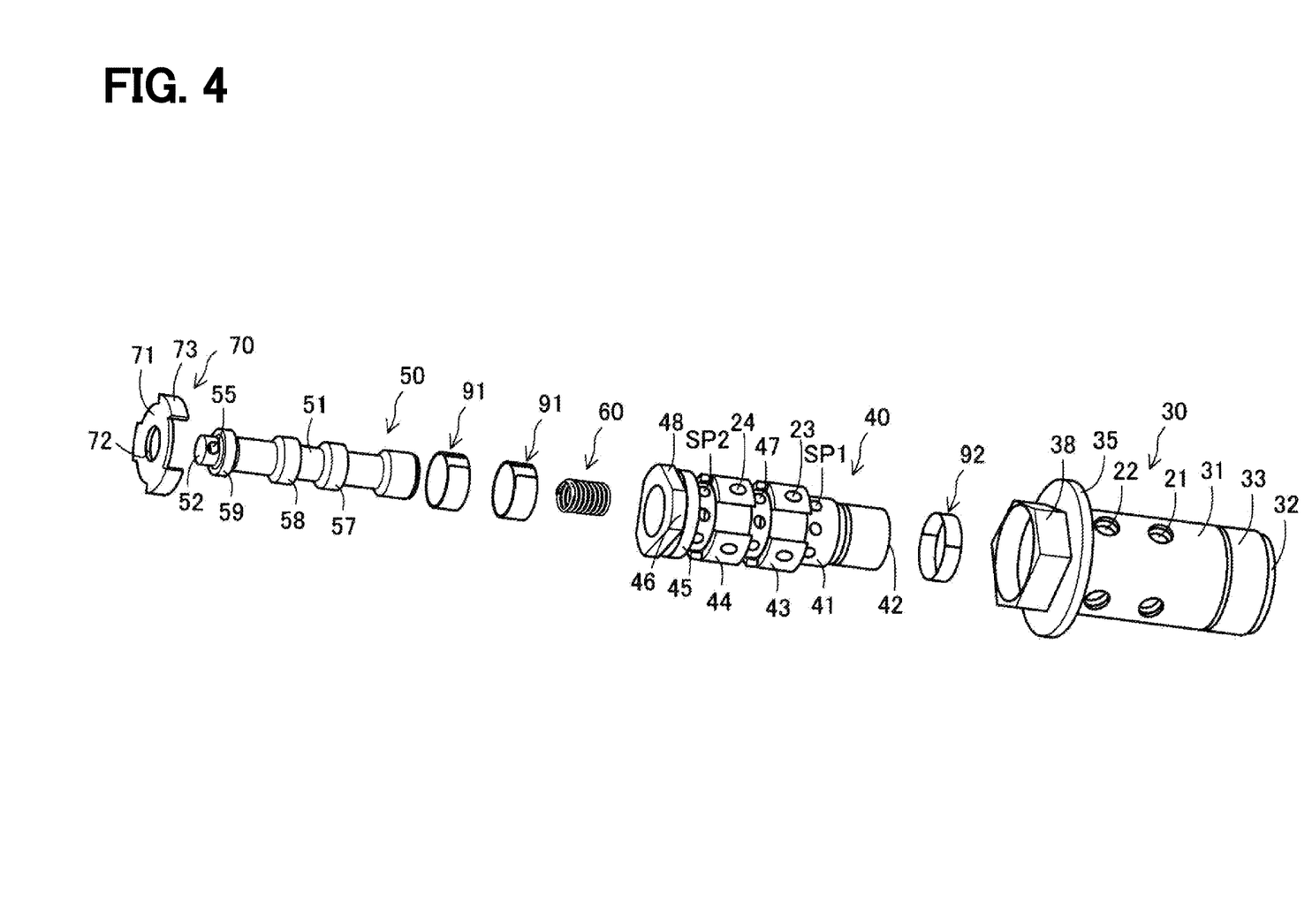
FIG. 4 is an exploded perspective view showing a detailed configuration of the hydraulic oil control valve.

As shown in FIGS. 3 and 4, the hydraulic oil control valve 10 includes a sleeve 20, the spool 50, the spring 60, a fixing member 70, and a check valve 90. FIG. 3 is a cross-sectional view taken along the rotational axis AX.

The sleeve 20 includes the outer sleeve 30 and an inner sleeve 40. Each of the outer sleeve 30 and the inner sleeve 40 substantially has a tubular shape. The sleeve 20 has a schematic configuration in which the inner sleeve 40 is inserted into an axial hole 34 defined in the outer sleeve 30.

The outer sleeve 30 forms an outer contour of the hydraulic oil control valve 10 and is disposed radially outside of the inner sleeve 40. The outer sleeve 30 has the main body 31, a fixing portion 32, a protrusion 35, a large diameter portion 36, a movement restricting portion 80, and a tool engaging portion 38. The main body 31 and the fixing portion 32 define the axial hole 34 extending in the axial direction AD. The axial hole 34 passes through the outer sleeve 30 in the axial direction AD.

The main body 31 has a tubular appearance and is arranged in the through hole 136 of the vane rotor 130 as shown in FIG. 1. As shown in FIG. 4, the main body 31 defines multiple outer retard ports 21 and multiple outer advance ports 22. The multiple outer retard ports 21 are arranged adjacent to each other in the circumferential direction and pass through the main body 31 between an outer circumferential surface of the main body 31 and the axial hole 34. The multiple outer advance ports 22 are defined between the outer retard ports 21 and the solenoid 160 in the axial direction AD. The multiple outer advance ports 22 are arranged adjacent to each other in the circumferential direction and pass through the main body 31 between the outer circumferential surface of the main body 31 and the axial hole 34.

The fixing portion 32 has a tubular shape and is connected to the main body 31 in the axial direction AD. The fixing portion 32 has a diameter substantially the same as that of the main body 31 and is inserted into the shaft fixing portion 323 of the camshaft 320 as shown in FIG. 1. The fixing portion 32 has the male thread portion 33. The male thread portion 33 is screwed with the female thread portion 324 of the shaft fixing portion 323. The male thread portion 33 and the female thread portion 324 are fastened to each other, so that an axial force in the axial direction AD toward the camshaft 320 is applied to the outer sleeve 30 and the outer sleeve 30 is fixed to the end portion 321 of the camshaft 320. With the axial force, it is possible to prevent the hydraulic oil control valve 10 from being displaced from the end portion 321 of the camshaft 320 due to a rotational torque generated when the camshaft 320 pushes the intake valve 330. Thus, it is possible to restrict the hydraulic oil from leaking.

The protrusion 35 protrudes radially outward from the main body 31. As shown in FIG. 1, the protrusion 35 holds the vane rotor 130 between the protrusion 35 and the end portion 321 of the camshaft 320 in the axial direction AD.

As shown in FIG. 3, the large diameter portion 36 is formed in an end portion of the main body 31 closer to the solenoid 160. The large diameter portion 36 has an inner diameter that is larger than that of other portions of the main body 31. In the large diameter portion 36, a flange portion 46 of the inner sleeve 40, which will be described later, is arranged.

The movement restricting portion 80 is configured as a stepped portion in the radial direction on the inner circumferential surface of the outer sleeve 30, which is formed by the large diameter portion 36. The movement restricting portion 80 holds the flange portion 46 of the inner sleeve 40, which will be described later, between the movement restricting portion 80 and the fixing member 70 in the axial direction AD. As a result, the movement restricting portion 80 restricts the inner sleeve 40 from moving in a direction away from the electromagnetic portion 162 of the solenoid 160 in the axial direction AD.

The tool engaging portion 38 is formed between the protrusion 35 and the solenoid 160 in the axial direction AD. The tool engaging portion 38 is configured to be engaged with a tool such as a hexagon socket (not shown), and is used for fastening and fixing the hydraulic oil control valve 10 including the outer sleeve 30 to the end portion 321 of the camshaft 320.

The inner sleeve 40 has a tubular portion 41, a bottom portion 42, multiple retard protruding walls 43, multiple advance protruding walls 44, a sealing wall 45, the flange portion 46, and a stopper 49.

The tubular portion 41 substantially has a tubular shape and is located radially inside of the main body 31 and the fixing portion 32 of the outer sleeve 30. As shown in FIGS. 3 and 4, the tubular portion 41 defines retard supply ports SP1, advance supply ports SP2, and recycling ports 47. The retard supply ports SP1 are defined between the retard protruding walls 43 and the bottom portion 42 in the axial direction AD and pass through the tubular portion 41 between an outer circumferential surface and an inner circumferential surface of the tubular portion 41. In the present embodiment, the multiple retard supply ports SP1 are arranged in the circumferential direction on a half circumference of the tubular portion 41. However, the multiple retard supply ports SP1 may be arranged on an all circumference of the tubular portion 41 or the tubular portion 41 may have a single retard supply port SP1. The advance supply ports SP2 are defined between the advance protruding walls 44 and the solenoid 160 in the axial direction AD and pass through the tubular portion 41 between the outer circumferential surface and the inner circumferential surface of the tubular portion 41. In the present embodiment, the multiple advance supply ports SP2 are arranged in the circumferential direction on a half circumference of the tubular portion 41. However, the multiple advance supply ports SP1 may be arranged on an all circumference of the tubular portion 41 or the tubular portion 41 may have a single advance supply port SP2. The retard supply ports SP1 and the advance supply ports SP2 are in communication with the shaft hole portion 322 of the camshaft 320 shown in FIG. 1. As shown in FIGS. 3 and 4, the recycling ports 47 are defined between the retard protruding walls 43 and the advance protruding walls 44 in the axial direction AD and pass through the tubular portion 41 between the outer circumferential surface and the inner circumferential surface of the tubular portion 41. The recycling ports 47 are in communication with the retard supply ports SP1 and the advance supply ports SP2. Specifically, the recycling ports 47 are in communication with the retard supply ports SP1 through spaces that are defined between the inner circumferential surface of the main body 31 of the outer sleeve 30 and the outer circumferential surface of the tubular portion 41 of the inner sleeve 40 and that are defined between adjacent ones of the retard protruding walls 43 in the circumferential direction. The recycling ports 47 are in communication with the advance supply ports SP2 through spaces that are defined between the inner circumferential surface of the main body 31 of the outer sleeve 30 and the outer circumferential surface of the tubular portion 41 of the inner sleeve 40 and that are defined between adjacent ones of the advance protruding walls 44 in the circumferential direction. Therefore, the recycling ports 47 serve as a recycling mechanism for returning the hydraulic oil discharged from the retard chambers 141 or the advance chambers 142 to the supply source. In the present embodiment, multiple recycling ports 47 are formed adjacent to each other in the circumferential direction, but the tubular portion 41 may have a single recycling port 47. An operation of the valve timing adjustment device 100 including a switching of the oil channels by sliding the spool 50 will be described later.

As shown in FIG. 3, the bottom portion 42 is integrally formed with the tubular portion 41 and closes an end portion of the tubular portion 41 away from the solenoid 160 in the axial direction AD (in other words, an end portion of the tubular portion 41 closer to the camshaft 320). One end of the spring 60 is in contact with the bottom portion 42.

As shown in FIG. 4, the multiple retard protruding walls 43 protrude radially outward from the tubular portion 41 and are arranged adjacent to each other in the circumferential direction. The retard protruding walls 43 define spaces therebetween in the circumferential direction. The spaces are in communication with the shaft hole portion 322 of the camshaft 320 shown in FIG. 1 and the hydraulic oil supplied from the hydraulic oil supply source 350 flows through the spaces. As shown in FIGS. 3 and 4, the retard protruding walls 43 respectively define inner retard ports 23. The inner retard ports 23 pass through the retard protruding walls 43 between an outer circumferential surface and an inner circumferential surface of the retard protruding walls 43. As shown in FIG. 3, the inner retard ports 23 are respectively in communication with the outer retard ports 21 defined in the outer sleeve 30. The inner retard port 23 has an axis that is displaced from an axis of the outer retard port 21 in the axial direction AD.

As shown in FIG. 4, the multiple advance protruding walls 44 are disposed between the retard protruding walls 43 and the solenoid 160 in the axial direction AD. The multiple advance protruding walls 44 protrude radially outward from the tubular portion 41 and are arranged adjacent to each other in the circumferential direction. The advance protruding walls 44 define spaces therebetween in the circumferential direction. The spaces are in communication with the shaft hole portion 322 shown in FIG. 1 and the hydraulic oil supplied from the hydraulic oil supply source 350 flows through the spaces. As shown in FIGS. 3 and 4, the advance protruding walls 44 respectively define inner advance ports 24. Each of the inner advance ports 24 passes through the advance protruding wall 44 between an outer circumferential surface and an inner circumferential surface of the advance protruding wall 44. As shown in FIG. 3, the inner advance ports 24 are respectively in communication with the outer advance ports 22 defined in the outer sleeve 30. The inner advance port 24 has an axis that is displaced from an axis of the outer advance port 22 in the axial direction AD.

The sealing wall 45 protrudes radially outward from an entire circumference of the tubular portion 41. The sealing wall 45 is disposed between the advance supply ports SP2 and the solenoid 160 in the axial direction AD. The sealing wall 45 seals a gap between the inner circumferential surface of the main body 31 of the outer sleeve 30 and the outer circumferential surface of the tubular portion 41 of the inner sleeve 40, thereby restricting the hydraulic oil flowing through a hydraulic oil supply passage 25, which will be described later, from leaking toward the solenoid 160. The sealing wall 45 has an outer diameter that is substantially same as that of the retard protruding walls 43 and that of the advance protruding walls 44.

The flange portion 46 protrudes radially outward from an entire circumference of the tubular portion 41 at an end portion of the inner sleeve 40 facing the solenoid 160. The flange portion 46 is arranged in the large diameter portion 36 of the outer sleeve 30. As shown in FIG. 4, the flange portion 46 includes multiple fitting portions 48. The multiple fitting portions 48 are arranged adjacent to each other in the circumferential direction at an outer edge of the flange portion 46. In the present embodiment, the fitting portions 48 are formed by cutting off an outer edge of the flange portion 46 straight. However, the fitting portions 48 may be formed by cutting off the outer edge into a curved shape. Fitting portions 48 are fit to fitting protrusions 73 of the fixing member 70 which will be described later.

As shown in FIG. 3, the stopper 49 is formed at the end portion of the inner sleeve 40 closer to the camshaft 320 in the axial direction AD. The stopper 49 has an inner diameter smaller than that of other portion of the tubular portion 41 such that the end portion of the spool 50 closer to the camshaft 320 can come into contact with the stopper 49. The stopper 49 defines a sliding limit position of the spool 50 in a direction away from the electromagnetic portion 162 of the solenoid 160.

The inner sleeve 40 and the axial hole 34 defined in the outer sleeve 30 define a space therebetween and the space serves as the hydraulic oil supply passage 25. The hydraulic oil supply passage 25 is in communication with the shaft hole portion 322 of the camshaft 320 shown in FIG. 1 and guides the hydraulic oil supplied from the hydraulic oil supply source 350 to the retard supply ports SP1 and the advance supply ports SP2. As shown in FIG. 3, the outer retard ports 21 and the inner retard ports 23 form retard ports 27 that are in communication with the retard chambers 141 through the retard channels 137 shown in FIG. 2. As shown in FIG. 3, the outer advance ports 22 and the inner advance ports 24 form advance ports 28 that are in communication with the advance chambers 142 through the advance channels 138 shown in FIG. 2.

As shown in FIG. 3, at least a part in the axial direction AD between the outer sleeve 30 and the inner sleeve 40 is sealed to restrict a leak of the hydraulic oil. More specifically, the retard protruding walls 43 seal gaps between the retard ports 27 and the retard supply ports SP1 and between the retard ports 27 and the recycling ports 47. The advance protruding walls 44 seal gaps between the advance ports 28 and the advance supply ports SP2 and between the advance ports 28 and the recycling ports 47. Further, the sealing wall 45 seals a gap between the hydraulic oil supply passage 25 and an outside of the hydraulic oil control valve 10. That is, an area in the axial direction AD between the retard protruding walls 43 and the sealing wall 45 is set as a sealing area SA. Further, in the present embodiment, the main body 31 of the outer sleeve 30 has an inner diameter that is substantially constant in the sealing area SA.

The spool 50 is arranged radially inside of the inner sleeve 40. The spool 50 has an end portion in contact with the solenoid 160 and is driven and moved in the axial direction AD by the solenoid 160. The spool 50 has a spool tubular portion 51, a spool bottom portion 52, and a spring receiving portion 56. Further, the spool 50 defines a drain inlet 54, a drain outlet 54, and at least a portion of a drain passage 53.

Figure 6:
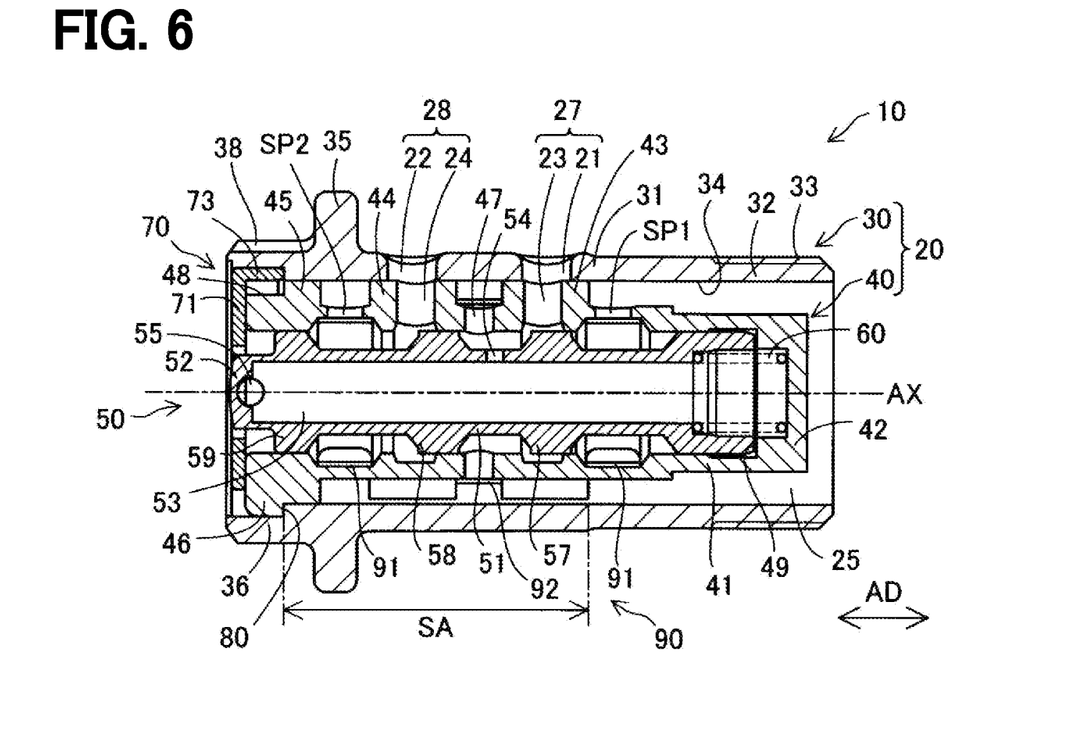
FIG. 6 is a cross-sectional view showing a state where a spool is in contact with a stopper.

As shown in FIGS. 3 and 4, the spool tubular portion 51 substantially has a tubular shape. The spool tubular portion 51 has a retard sealing portion 57, an advance sealing portion 58, and a stopper 59 on an outer circumferential surface of the spool tubular portion 51. The retard sealing portion 57, the advance sealing portion 58, and the stopper 59 are arranged in this order from the end portion of the spool 50 closer to the camshaft 320 in the axial direction AD. Each of the retard sealing portion 57, the advance sealing portion 58, and the stopper 59 protrudes radially outward entirely in the circumferential direction. As shown in FIG. 3, the retard sealing portion 57 blocks a communication between the recycling ports 47 and the retard ports 27 when the spool 50 is located at the closest position to the electromagnetic portion 162 of the solenoid 160. As shown in FIG. 6, the retard sealing portion 57 blocks a communication between the retard supply ports SP1 and the retard ports 27 when the spool 50 is located at the farthest position from the electromagnetic portion 162. As shown in FIG. 3, the advance sealing portion 58 blocks a communication between the advance supply ports SP2 and the advance ports 28 when the spool 50 is located at the closest position to the electromagnetic portion 162. As shown in FIG. 6, the advance sealing portion 58 blocks a communication between the recycling ports 47 and the advance ports 28 when the spool 50 is located at the farthest position from the electromagnetic portion 162. As shown in FIG. 3, the stopper 59 defines the sliding limit of the spool 50 toward the electromagnetic portion 162 of the solenoid 160 by coming into contact with the fixing member 70.

The spool bottom portion 52 is integrally formed with the spool tubular portion 51 and closes an end portion of the spool tubular portion 51 facing the solenoid 160. The spool bottom portion 52 can protrude from the sleeve 20 toward the solenoid 160 in the axial direction AD. The spool bottom portion 52 serves as a proximal end portion of the spool 50.

A space surrounded by the spool tubular portion 51, the spool bottom portion 52, the tubular portion 41 of the inner sleeve 40, and the bottom portion 42 of the inner sleeve 40 serves as the drain passage 53. Therefore, the inside of the spool 50 serves as at least a part of the drain passage 53. The hydraulic oil discharged from the retard chambers 141 and the advance chambers 142 flows through the drain passage 53.

The drain inlet 54 is defined in the spool tubular portion 51 between the retard sealing portion 57 and the advance sealing portion 58 in the axial direction AD. The drain inlet 54 passes through the spool tubular portion 51 between the outer circumferential surface and the inner circumferential surface of the spool tubular portion 51. The drain inlet 54 guides the hydraulic oil discharged from the retard chambers 141 and the advance chambers 142 to the drain passage 53. Further, the drain inlet 54 is in communication with the supply ports SP1 and SP2 through the recycling ports 47.

The spool bottom portion 52, which is an end of the spool 50, defines the drain outlet 54 opening radially outward. The hydraulic oil in the drain passage 53 is discharged from the hydraulic oil control valve 10 through the drain outlet 54. As shown in FIG. 1, the hydraulic oil discharged through the drain outlet 54 is collected in the oil pan 352.

As shown in FIG. 3, the spring receiving portion 56 is formed at an end portion of the spool tubular portion 51 closer to the camshaft 320 and has an inner diameter that is larger than other portion of the spool tubular portion 51. The other end of the spring 60 is in contact with the spring receiving portion 56.

In the present embodiment, each of the outer sleeve 30 and the spool 50 is made of iron and the inner sleeve 40 is made of aluminum. Materials of the outer sleeve 30, the spool 50, and the inner sleeve 40 are not limited to these materials, and may be any metal material, resin material, or the like.

The spring 60 is configured with a compression coil spring and has one end in contact with the bottom portion 42 of the inner sleeve 40 and the other end in contact with the spring receiving portion 56 of the spool 50. The spring 60 biases the spool 50 toward the solenoid 160 in the axial direction AD.

The fixing member 70 is fixed to the end portion of the outer sleeve 30 facing the solenoid 160. As shown in FIG. 4, the fixing member 70 includes a flat plate portion 71 and multiple fitting protrusions 73.

The flat plate portion 71 has a flat plate shape extending in the radial direction. Extending direction of the flat plate portion 71 is not limited to the radial direction and may be a direction intersecting the axial direction AD. The flat plate portion 71 defines an opening 72 at a center of the flat plate portion 71. As shown in FIG. 3, the spool bottom portion 52, which is one end portion of the spool 50, is inserted into the opening 72.

As shown in FIG. 4, the multiple fitting protrusions 73 protrude from the flat plate portion 71 in the axial direction AD, and are arranged side by side in the circumferential direction. Protruding direction of the fitting protrusions 73 is not limited to the axial direction AD and may be any direction intersecting the radial direction. The fitting protrusions 73 fit to the fitting portions 48 of the inner sleeve 40 respectively.

As shown in FIG. 4, the spool 50 is inserted into the inner sleeve 40 and the fixing member 70 is assembled such that the fitting protrusions 73 fit to the fitting portions 48. After that, the fixing member 70 is deformed to be fixed to the outer sleeve 30. An outer edge portion of the end surface of the fixing member 70 facing the solenoid 160 serves as deformed portions 74 that are deformed to be fixed to the outer sleeve 30.

The fixing member 70 is fixed to the outer sleeve 30 while the fitting protrusions 73 fit to the fitting portions 48. Thus, the inner sleeve 40 is restricted from rotating in the circumferential direction relative to the outer sleeve 30. Further, the fixing member 70 is fixed to the outer sleeve 30, so that the inner sleeve 40 and the spool 50 are restricted from coming off from the outer sleeve 30 in the axial direction AD toward the solenoid 160.

The check valve 90 suppresses a backflow of the hydraulic oil. The check valve 90 includes two supply check valves 91 and a recycling check valve 92. As shown in FIG. 4, each of the supply check valves 91, and the recycling check valve 92 are formed by winding a band-shaped thin plate into an annular shape, so that each of the supply check valves 91 and the recycling check valve 92 can be elastically deformed in the radial direction. As shown in FIG. 3, each of the supply check valves 91 is arranged in contact with the inner circumferential surface of the tubular portion 41 at a position corresponding to the retard supply port SP1 or the advance supply port SP2. When each of the supply check valves 91 receives pressure of the hydraulic oil from an outside of the each of the supply check valves 91 in the radial direction, an overlapping area of the band-shaped thin plate increases and the each of the supply check valves 91 shrinks in the radial direction. The recycling check valve 92 is arranged in contact with the outer circumferential surface of the tubular portion 41 at a position corresponding to the recycling port 47. When the recycling check valve 92 receives the pressure of the hydraulic oil from an inside of the recycling check valve 92 in the radial direction, an overlapping area of the band-shaped thin plate decreases and expands in the radial direction.

In the present embodiment, the shaft fixing portion 323 corresponds to a subordinate concept of the shaft fixing hole in the present disclosure. In the present embodiment, the crankshaft 310 is a subordinate concept of the drive shaft in the present disclosure, the camshaft 320 is a subordinate concept of the driven shaft in the present disclosure, the intake valve 330 is a subordinate concept of the valve in the present disclosure, and the solenoid is a subordinate concept of the actuator in the present disclosure.

A-2. Assembling the Valve Timing Adjustment Device:

The valve timing adjustment device 100 shown in FIG. 1 is assembled by fitting the end portion 321 of the camshaft 320 to the rotor fitting portion 139 of the vane rotor 130, holding the vane rotor 130 between the protrusion 35 formed on the outer sleeve 30 of the hydraulic oil control valve 10 and the end portion 321 of the camshaft 320 in the axial direction AD, and fastening the hydraulic oil control valve 10 to the end portion 321 of the camshaft 320. As described above, the fastening is realized by screwing the male thread portion 33 formed in the fixing portion 32 of the outer sleeve 30 with the female thread portion 324 formed in the shaft fixing portion 323 and tightening them with a predetermined torque.

Further, as described above, portions of the through hole 136 formed in the vane rotor 130 between the retard channels 137 and the advance channels 138 are sealed by the main body 31 of the outer sleeve 30 to separate the retard ports 27 and the retard channels 137 that are in communication with the retard chambers 141 from the advance ports 28 and the advance channels 138 that are in communication with the advance chambers 142. Therefore, between the retard channels 137 and the advance channels 138, a radial gap between the outer circumferential surface of the main body 31 and the through hole 136 is set to an extremely small value.

Here, an axis of the main body 31 of the outer sleeve 30 may be offset from an axis of the fixing portion 32 due to manufacturing errors of the hydraulic oil control valve 10, which is called coaxial misalignment". "Coaxial misalignment" means that axes that should originally be coaxial with each other are offset from each other. Further, the vane rotor 130, the camshaft 320, and the hydraulic oil control valve 10 are all assembled so that the rotational axes AX of them are coaxial with each other. However, coaxial misalignment may occur due to manufacturing errors of each of them. Here, the through hole 136 is sealed by the main body 31 of the outer sleeve 30 when the main body 31 is assembled into the through hole 136 such that the main body 31 is coaxial with the through hole 136. In this state, a coaxial misalignment may occur between the through hole 136 of the vane rotor 130 and the shaft fixing portion 323 of the camshaft 320. As an allowable range of coaxial misalignment (i.e., design tolerance), a coaxiality A between the main body 31 and the fixing portion 32 and a coaxiality B between the through hole 136 and the shaft fixing portion 323 are predetermined. "A coaxiality" is an index indicating how much two axes are offset from each other and corresponds to a range in which one of the axes is offset from the other. A total value of the coaxiality A and the coaxiality B corresponds to a shaft misalignment amount when a coaxiality between the shaft fixing portion 323 and the fixing portion 32 is the largest because each of the misalignment between the main body 31 and the fixing portion 32 and the misalignment between the through hole 136 and the shaft fixing portion 323 is large.

Figure 5:
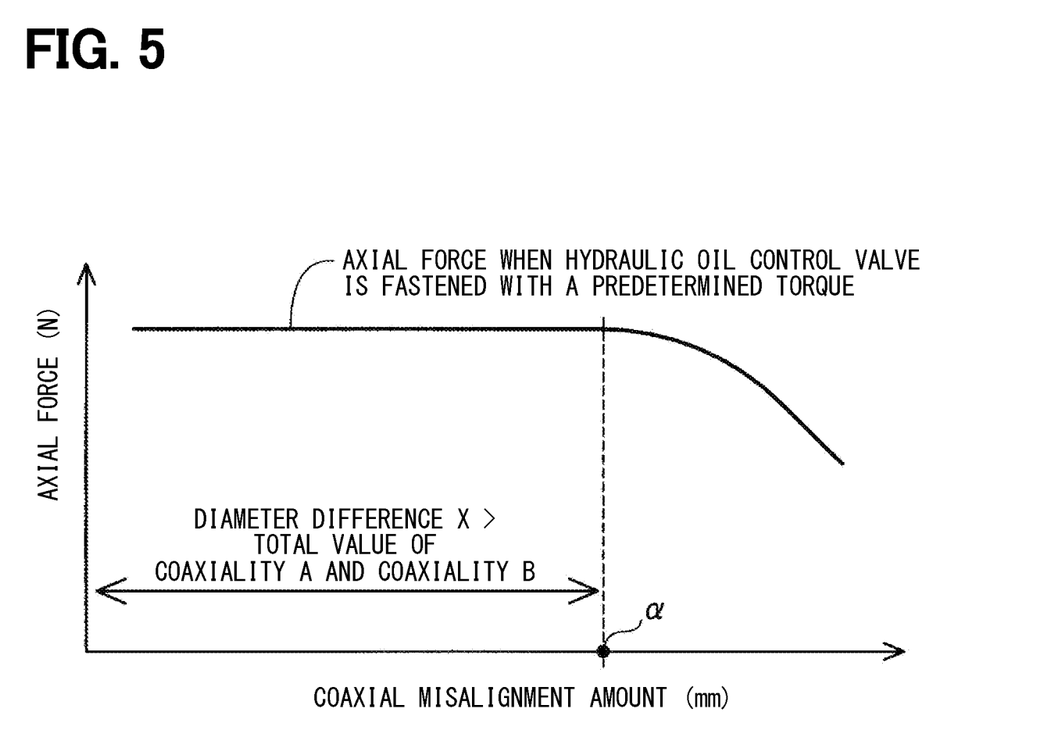
FIG. 5 is an explanatory diagram for explaining a relationship between a total value of coaxialities and an axial force.

A relationship between the total value of the coaxialities and an axial force will be described with reference to FIGS. 1 and 5. In FIG. 5, the vertical axis represents the axial force (N) when the hydraulic oil control valve 10 is fastened and fixed to the end portion 321 of the camshaft 320, and the horizontal axis represents the coaxial misalignment amount (mm) between the shaft fixing portion 323 and the fixing portion 32. The coaxial misalignment between the shaft fixing portion 323 and the fixing portion 32 increases due to an increase in the coaxial misalignment between the main body 31 and the fixing portion 32 and an increase in the coaxial misalignment between the through hole 136 and the shaft fixing portion 323. In FIG. 5, the axial force when the hydraulic oil control valve 10 is fastened with a predetermined torque is shown by a thick line.

As shown in FIG. 5, when the coaxial misalignment amount between the shaft fixing portion 323 and the fixing portion 32 is equal to or greater than a predetermined value α indicated by a broken line, a part of the torque during the fastening cannot be used to screw the male thread portion 33 with the female thread portion 324 and a loss of the torque becomes large. Therefore, even if the fastening is performed with a predetermined torque, the required axial force cannot be applied and the axial force is reduced.

On the other hand, in the valve timing adjustment device 100 of the present embodiment, a difference between a radial dimension of the shaft fixing portion 323 and a radial dimension of the fixing portion 32 (hereinafter, also referred to as "a diameter difference X") is set to a value greater than the total value of the coaxiality A and the coaxiality B. More specifically, a difference between an effective diameter of the female thread portion 324 of the shaft fixing portion 323 and an effective diameter of the male thread portion 33 of the fixing portion 32 is set to a value greater than the total value of the coaxiality A and the coaxiality B. As shown in FIG. 5, in the range where the diameter difference X is set to a value greater than the total value of the coaxiality A and the coaxiality B, the axial force when the hydraulic oil control valve 10 is fastened with a predetermined torque is substantially constant. The reason for this is that a radial gap between the shaft fixing portion 323 and the fixing portion 32 can suppress the torque loss caused by the coaxial misalignment during the fastening and can suppress a decrease in the axial force. Here, in general, ISO grade 6H is often used for female threads and ISO grade 6g is often used for male threads. In such a configuration, an effective diameter of the female thread portion 324 is increased and/or an effective diameter of the male thread portion 33 is decreased to set the difference between the effective diameters to a value greater than the coaxial misalignment.

A-3. Operation of Valve Timing Adjustment Device:

As shown in FIG. 1, the hydraulic oil supplied from the hydraulic oil supply source 350 to the supply inlet 326 flows into the hydraulic oil supply passage 25 through the shaft hole portion 322. When the solenoid 160 is not energized and the spool 50 is located at the closest position to the solenoid 160 as shown in FIG. 3, the retard ports 27 are in communication with the retard supply ports SP1. As a result, the hydraulic oil in the hydraulic oil supply passage 25 is supplied into the retard chambers 141, the vane rotor 130 rotates in the retard direction relative to the housing 120, and a relative rotation phase of the camshaft 320 with respect to the crankshaft 310 is shifted in the retard direction. Further, in this state, the advance ports 28 are not in communication with the advance supply ports SP2 but in communication with the recycling ports 47. As a result, the hydraulic oil discharged from the advance chambers 142 is returned to the retard supply ports SP1 through the recycling ports 47 and recirculated. Further, a part of the hydraulic oil discharged from the advance chambers 142 flows into the drain passage 53 through the drain inlet 54, and is returned to the oil pan 352 through the drain outlet 54.

When the solenoid 160 is energized and the spool 50 is located at the farthest position from the solenoid 160 as shown in FIG. 6, i.e., when the spool 50 is in contact with the stopper 49, the advance ports 28 are in communication with the advance supply ports SP2. As a result, the hydraulic oil in the hydraulic oil supply passage 25 is supplied into the advance chambers 142, the vane rotor 130 rotates in the advance direction relative to the housing 120, and the relative rotation phase of the camshaft 320 with respect to the crankshaft 310 is shifted in the advance direction. Further, in this state, the retard ports 27 are not in communication with the retard supply ports SP1 but in communication with the recycling ports 47. As a result, the hydraulic oil discharged from the retard chambers 141 is returned to the advance supply ports SP2 through the recycling ports 47 and recirculated. Further, a part of the hydraulic oil discharged from the retard chambers 141 flows into the drain passage 53 through the drain inlet 54, and is returned to the oil pan 352 through the drain outlet 54.

Figure 7:
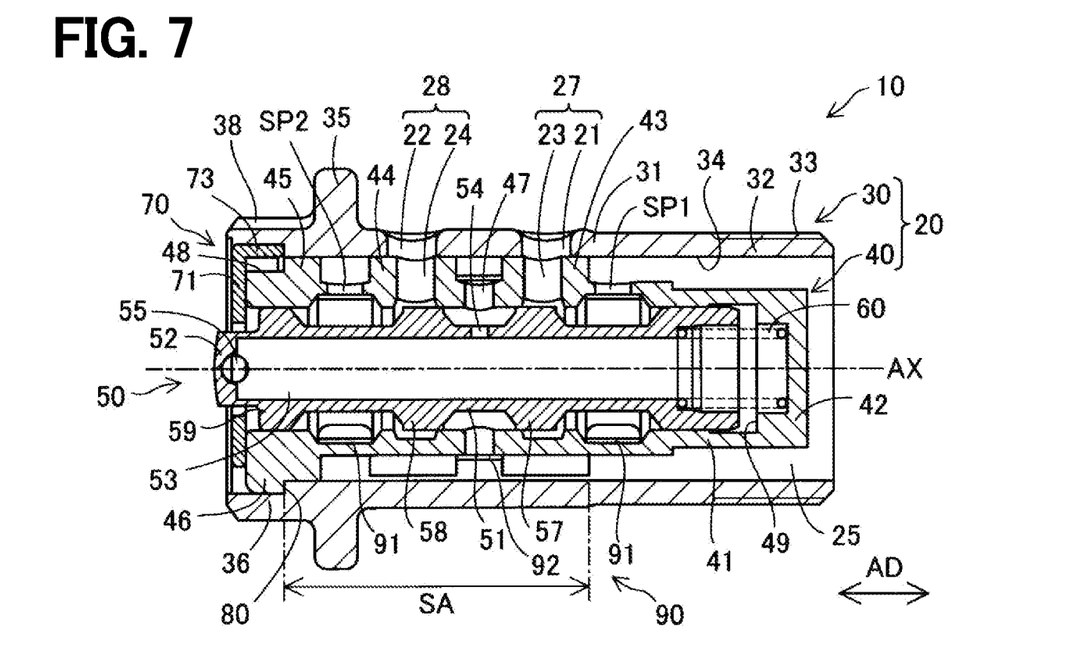
FIG. 7 is a cross-sectional view showing a state where the spool is located substantially at a center in a sliding area.

Further, as shown in FIG. 7, when the solenoid 160 is energized and the spool 50 is located substantially in the center of the sliding area, the retard ports 27 are in communication with the retard supply ports SP1 and the advance ports 28 are in communication with the advance supply ports SP2. As a result, the hydraulic oil in the hydraulic oil supply passage 25 is supplied to both the retard chambers 141 and the advance chambers 142, the vane rotor 130 is restricted from rotating relative to the housing 120, and the relative rotation phase of the camshaft 320 with respect to the crankshaft 310 is maintained.

The hydraulic oil supplied to the retard chambers 141 or the advance chambers 142 flows into the housing hole 132 through the retard chamber pin control oil channel 133 or the advance chamber pin control oil channel 134. Therefore, when sufficient hydraulic pressure is applied to the retard chambers 141 or the advance chambers 142, the lock pin 150 comes off from the fitting recessed portion 128 and the vane rotor 130 is allowed to rotate relative to the housing 120.

When the relative rotation phase of the camshaft 320 is advanced from the target phase, the valve timing adjustment device 100 sets an energizing amount to the solenoid 160 to a relatively small value and rotate the vane rotor 130 in the retard direction relative to the housing 120. As a result, the relative rotation phase of the camshaft 320 with respect to the crankshaft 310 is shifted in the retard direction and the valve timing is retarded. Further, when the relative rotation phase of the camshaft 320 is retarded from the target value, the valve timing adjustment device 100 sets the energization amount to the solenoid 160 to a relatively large value and rotates the vane rotor 130 in the advance direction relative to the housing 120. As a result, the relative rotation phase of the camshaft 320 with respect to the crankshaft 310 is shifted in the advance direction and the valve timing is advanced. Further, when the relative rotation phase of the camshaft 320 matches the target phase, the valve timing adjustment device 100 sets the energization amount to the solenoid 160 to a medium value and restricts the vane rotor 130 from rotating relative to the housing 120. As a result, the relative rotation phase of the camshaft 320 with respect to the crankshaft 310 is maintained and the valve timing is maintained.

According to the valve timing adjustment device 100 of the present embodiment described above, a diameter difference X between a radial dimension of the shaft fixing portion 323 and a radial dimension of the fixing portion 32 is set to a value greater than a total of a predetermined coaxiality B between the through hole 136 and the shaft fixing portion 323 and a predetermined coaxiality A between the main body 31 and the fixing portion 32. Thus, when the hydraulic oil control valve 10 is fastened to the end portion 321 of the camshaft 320, a loss of a torque caused by a coaxial misalignment between the through hole 136 and the shaft fixing portion 323 and a coaxial misalignment between the main body 31 and the fixing portion 32 can be suppressed. That is, the influence of the coaxial misalignment between the through hole 136 and the shaft hole portion 322 and the coaxial misalignment between the main body 31 and the fixing portion 32 caused by manufacturing errors can be absorbed by the diameter difference X (in other words, play) between a radial dimension of the shaft hole portion 322 and a radial dimension of the fixing portion 32. Therefore, it is possible to suppress a decrease in the axial force when the hydraulic oil control valve 10 is fastened with a predetermined torque and it is possible to fasten the hydraulic oil control valve 10 to the camshaft 320 with an axial force equal to or higher than a predetermined value. Therefore, in fixing the hydraulic oil control valve 10 of the integrated valve timing adjustment device 100 to the camshaft 320, it is possible to suppress a decrease in reliability.

Further, since the fixing portion 32 has the male thread portion 33 and the shaft fixing portion 323 has the female thread portion 324, the hydraulic oil control valve 10 can be fixed to the end portion 321 of the camshaft 320 by screwing the thread portions with each other and the axial force can be easily applied to the hydraulic oil control valve 10. Therefore, it is possible to prevent the hydraulic oil control valve 10 and the end portion 321 of the camshaft 320 from being offset from each other due to the rotational torque of the camshaft 320, and it is possible to prevent the hydraulic oil from leaking. Further, since a difference between an effective diameter of the female thread portion 324 and an effective diameter of the male thread portion 33 is set to a value greater than a total of the coaxiality A and the coaxiality B, the influence of the coaxial misalignment can be absorbed by a play generated by the difference of the effective diameters. Thus, a loss of the torque can be suppressed and a decrease in an axial force can be suppressed.

Further, since the sleeve 20 has a double-structure including the outer sleeve 30 and the inner sleeve 40, the hydraulic oil supply passage 25 can be easily defined by a space between the axial hole 34 formed in the outer sleeve 30 and the inner sleeve 40. Therefore, as compared with a configuration in which an inside of the spool 50 serves as the hydraulic oil supply passage, it is possible to suppress the hydraulic pressure from being applied to the spool 50 when supplying the hydraulic oil. As a result, it is possible to suppress deterioration of the slidability of the spool 50. Further, since the sleeve 20 has the double-structure, the ports SP1, SP2, 23, 24, and 47 can be easily defined in the inner sleeve 40. Therefore, the workability of each of the ports SP1, SP2, 27, 28, and 47 in the sleeve 20 can be improved and the manufacturing process of the sleeve 20 can be restricted from becoming complicated. Further, since the workability can be improved, the degree of freedom in designing each port SP1, SP2, 27, 28, 47 can be improved, and the mountability of the hydraulic oil control valve 10 and the valve timing adjustment device 100 can be improved.

Other Embodiments

In the above embodiment, the hydraulic oil control valve 10 and the camshaft 320 are fixed by fastening with thread portions, but the present disclosure is not limited to this. The male thread portion 33 and the female thread portion 324 may be omitted. For example, the hydraulic oil control valve 10 may be fixed to the camshaft 320 by inserting a rod member from a radially outside of the end portion 321 of the camshaft 320 and the hydraulic oil control valve 10 to pass therethrough. Further, the hydraulic oil control valve 10 may be fixed to the camshaft 320 by an arbitrary fixing method such as welding. Even with such a configuration, the same effect as those of the above described embodiments can be obtained.

The configurations of the hydraulic oil control valves 10 in the above embodiments are examples and may be variously altered. For example, the sleeve 20 is not limited to the double-structured sleeve 20 including the outer sleeve 30 and the inner sleeve 40, and may be configured with a single member. Further, for example, the hydraulic oil control valve 10 may be driven by an arbitrary actuator such as an electric motor or an air cylinder instead of the solenoid 160. Such a configuration also achieves the same effects as those of the embodiment described above.

In the above embodiment, the valve timing adjustment device 100 adjusts the valve timing of the intake valve 330 that is opened and closed by the camshaft 320. However, the valve timing adjustment device 100 may adjust the valve timing of the exhaust valve 340. Further, the valve timing adjustment device 100 may be fixed to the end portion 321 of the camshaft 320 as a driven shaft to which a driving force is transmitted from the crankshaft 310 as the driving shaft through an intermediate shaft. Alternatively, the camshaft may have a double structure including a drive shaft and a driven shaft and may be fixed to one of an end of the drive shaft and an end of the driven shaft of the camshaft.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they may be omitted as appropriate.

What is claimed is:

1. A valve timing adjustment device configured to adjust valve timing of a valve in an internal combustion engine, the valve being configured to be selectively opened and closed by a driven shaft to which a driving force is transmitted from a drive shaft, the valve timing adjustment device comprising:
a vane rotor that is fixed to an end portion of the driven shaft, that is configured to rotate together with the driven shaft, and that is configured to alter a phase of the driven shaft relative to the drive shaft according to a pressure of a hydraulic oil supplied from a hydraulic oil supply source, the vane rotor defining a through hole passing through the vane rotor in an axial direction;
a hydraulic oil control valve that is configured to perform a flow control of the hydraulic oil, the flow control including a control to supply the hydraulic oil to the vane rotor and a control to discharge the hydraulic oil from the vane rotor, the hydraulic oil control valve including:
a tubular sleeve that includes a body portion disposed in the through hole and a fixing portion inserted and fixed into a shaft fixing hole, the shaft fixing hole being defined in the end portion of the driven shaft; and
a spool that is configured to slidably move in the axial direction within the sleeve, wherein at least a portion of the through hole in the axial direction is sealed by the body portion, a difference between a radial dimension of the shaft fixing hole and a radial dimension of the fixing portion is greater than a total of a predetermined coaxiality between the through hole and the shaft fixing hole and a predetermined coaxiality between the body portion and the fixing portion, and the total is greater than zero.

2. The valve timing adjustment device according to claim 1, wherein the fixing portion includes a male thread portion configured to be engaged with a female thread portion formed in the shaft fixing hole, and a difference between an effective diameter of the female thread portion and an effective diameter of the male thread portion is greater than the total.

\* \* \* \* \*